United States Patent
Kleinert et al.

(10) Patent No.: US 9,522,631 B2
(45) Date of Patent: Dec. 20, 2016

(54) SYSTEM AND METHOD FOR NOTIFYING A DRIVER OF POSSIBLE REAR SEAT PASSENGERS OR OBJECTS

(71) Applicant: GM GLOBAL TECHNOLOGY OPERATIONS LLC, Detroit, MI (US)

(72) Inventors: Julie A. Kleinert, Fenton, MI (US); John R. Dolan, Woodhaven, MI (US); Anna M. Saadatjoo, Huntington Woods, MI (US); Tricia E. Morrow, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 59 days.

(21) Appl. No.: 14/551,205

(22) Filed: Nov. 24, 2014

(65) Prior Publication Data

US 2016/0144781 A1 May 26, 2016

(51) Int. Cl.
*G08B 21/22* (2006.01)
*G08B 21/24* (2006.01)
*B60Q 9/00* (2006.01)
*B60Q 3/00* (2006.01)
*B60Q 5/00* (2006.01)

(52) U.S. Cl.
CPC . *B60Q 9/00* (2013.01); *B60Q 3/00* (2013.01); *B60Q 5/005* (2013.01); *G08B 21/22* (2013.01); *G08B 21/24* (2013.01)

(58) Field of Classification Search
CPC .................................................. B60N 2/002
See application file for complete search history.

(56) References Cited

U.S. PATENT DOCUMENTS

| | | | |
|---|---|---|---|
| 6,489,889 B1 | 12/2002 | Smith | |
| 7,079,016 B2 | 7/2006 | Ho | |
| 8,493,201 B2 | 7/2013 | Orbach | |
| 2012/0050021 A1 | 3/2012 | Rao | |
| 2012/0268265 A1* | 10/2012 | Morley | B60N 2/002 340/457 |
| 2014/0015664 A1* | 1/2014 | Watson | B60Q 11/00 340/457.1 |
| 2015/0266395 A1* | 9/2015 | Bradley | B60N 2/002 701/1 |

* cited by examiner

*Primary Examiner* — Todd Melton
(74) *Attorney, Agent, or Firm* — Quinn Law Group

(57) ABSTRACT

A vehicle includes a body having a door and a door latch, a display screen, front and rear seats, a seat belt, buckle and door latch sensors, and a controller. The latch sensors determine a latch state of the seat belt buckle and door latch. The controller determines the respective latch states of the seat belt buckle and the door latch via the respective latch sensors. The controller also displays a first icon/message via the display screen in response to an ignition-off event, with the icon or message prompting a driver to check the rear seat for the presence of a passenger or object. A second control action is executed by the controller in addition to the first control action in response to the latch state of the seat belt buckle and/or door latch being in the latched or closed latch state for less than a calibrated amount of time.

20 Claims, 3 Drawing Sheets

SYSTEM AND METHOD FOR NOTIFYING A DRIVER OF POSSIBLE REAR SEAT PASSENGERS OR OBJECTS

TECHNICAL FIELD

The present disclosure relates to a system and method for notifying a driver of possible rear seat passengers or objects.

BACKGROUND

Modern automotive passenger vehicles include a driver-side and passenger-side front seat oriented facing a normal forward direction of travel. At least one row of rear seats is typically positioned aft of the front seats. Depending on the vehicle configuration, the rear seats may be accessed via a front door or via a separate rear door. The rear seats of modern passenger vehicles include lap and shoulder seat belts and buckles which together secure a passenger or object with respect to a surface of the rear seats. Passengers seated in a child restraint may be secured to one of the rear seats via the same seat belts and buckles, and/or via connection of the child restraint to a set of permanent LATCH ("Lower Anchors and Tethers for Children") anchors positioned with respect to the rear seat.

SUMMARY

A vehicle is described herein that includes, in a particular embodiment, a body having a door with a door latch, a display screen, front and rear seats, a rear seat belt assembly having a seat belt buckle and a mating latch plate, a buckle sensor, a door latch sensor, and a controller. The buckle sensor determines a latch state of the seat belt buckle. In a similar manner, the door latch sensor determines a latch state of the door latch. This information, which is communicated to the controller, may be used as part of a method for notifying a driver of the vehicle as to the possible presence of the passenger or object in the rear seat upon completion of a trip or ignition cycle.

The controller in this embodiment is in communication with the buckle and door latch sensors and with the display screen, e.g., an instrument cluster or a touch screen of a vehicle navigation system positioned in a center stack of the vehicle interior as is known in the art. The controller is programmed to determine respective open/unlatched or closed/latched latch states of the seat belt buckle and door latch via the respective buckle and door latch sensors, and to display a first icon or message via the display screen as a first control action in response to an ignition-off event of the vehicle. The first icon or message automatically prompts a driver of the vehicle to check the rear seat for the presence of the passenger or object. The controller may also executes a second control action, in addition to the first control action, in response to at least one of the latch state of the seat belt buckle and the latch state of the door latch being in a latched state, either in an absolute sense or within a calibrated window of elapsed time since the ignition-off event. In this manner, an escalating set of alerts are communicated to a driver of the vehicle at the end of a trip or ignition cycle to notify the driver of the possibility that a passenger or object may be present in the rear seat.

The controller may be programmed to display, upon detection of an ignition-on event of the vehicle, a second icon or message prompting the driver to enter an actual passenger/object presence response describing whether the passenger or object is in fact present in the rear seat at the start of the trip. The controller may thereafter display the first icon at the ignition-off event using the actual passenger/object presence response.

The controller may also be programmed to determine an amount of elapsed time since the latch state of the seat belt buckle and/or the door latch changed to a closed/latched latch state, and to execute the second control action when the elapsed time is less than a calibrated amount of time. Such an embodiment may be useful in eliminating false positive results, e.g., preventing execution of all but the first control action when there is otherwise no indication that the door and/or the seat belt has changed its corresponding latch state within the last few trips or ignition cycles.

The second control action may include sounding an audible alarm within the vehicle interior, flashing the first icon, flashing an interior light of the vehicle, and/or sounding a horn of the vehicle. Optionally, the second control action may include transmitting a text or audio message to a device positioned external to the vehicle.

The vehicle may include a camera operable to capture an image or video of the rear seat upon occurrence of the ignition-off event. The first or second control action may include displaying the image or video via the display screen.

A system is also disclosed for use in a vehicle having a door, a front seat, and a rear seat aft of the front seat that includes a seat belt assembly of the type described above. The system includes a display screen and a controller. The controller is in communication with the display screen and with separate buckle and door latch sensors, and is programmed to execute the method described in general above.

The above and other features and advantages of the present disclosure are readily apparent from the following detailed description of the best modes for carrying out the disclosure when taken in connection with the accompanying drawings.

DETAILED DESCRIPTION

Figure 1:
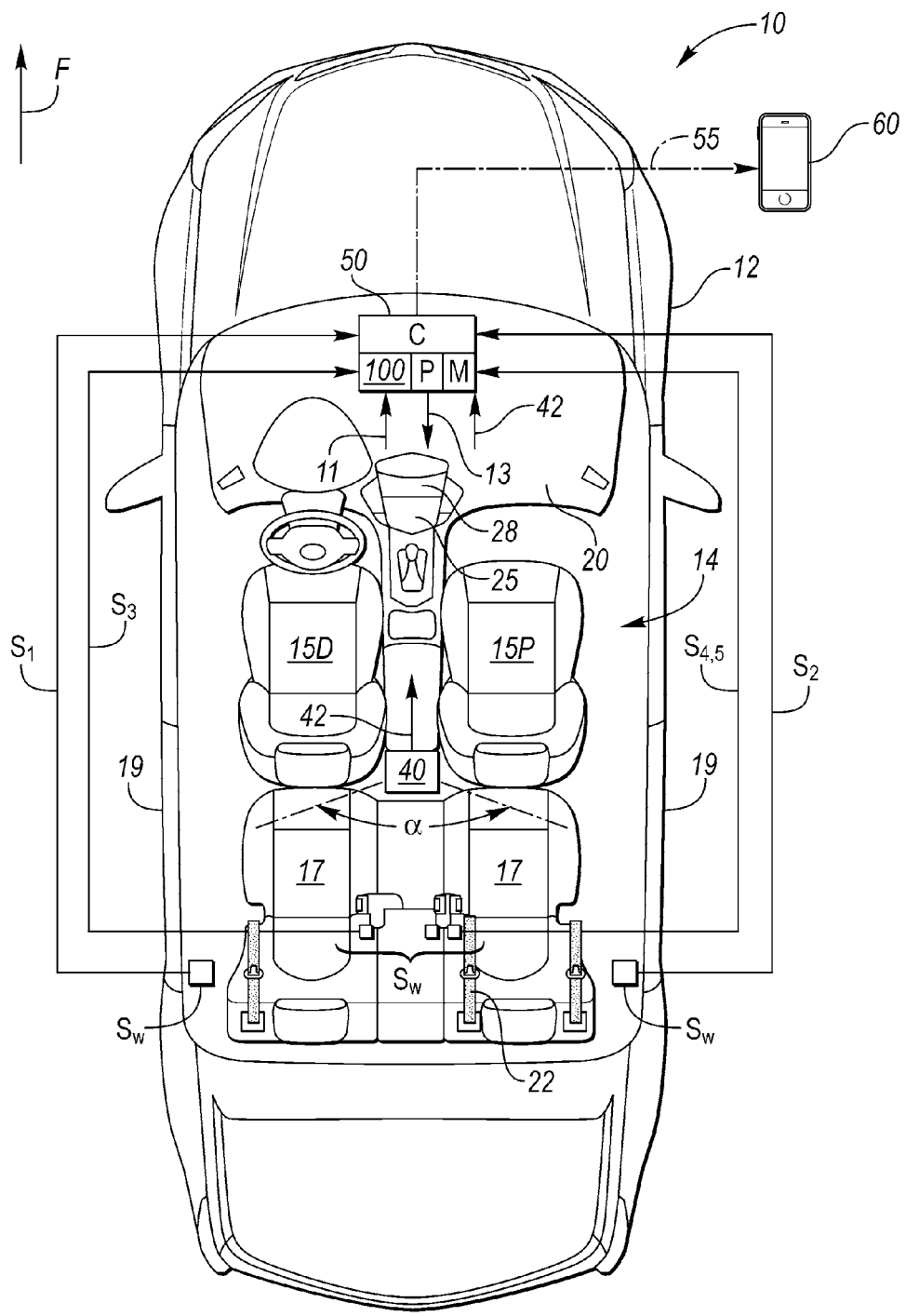
FIG. 1 is a schematic plan view illustration of an example vehicle having a rear seat and a controller that notifies or reminds a driver of the possible presence of passengers or objects in the rear seat.

Referring to the drawings, wherein like reference numbers correspond to like or similar components in the various figures, a vehicle 10 is shown in FIG. 1 having a normal forward direction of travel as indicated by arrow F. The vehicle 10 includes a body 12 defining a vehicle interior 14. In the example embodiment shown in FIG. 1 the vehicle interior 14 includes a driver-side front seat 15D and a passenger-side front seat 15P, both of which are oriented facing a dashboard 20 and a center stack 25. A rear seat 17 having one or more separate seats, e.g., a bench-style seat or separate bucket-style seats, is positioned aft of the front seats 15D, 15P, i.e., behind the front seats 15D and 15P with respect to the direction of travel (arrow F). Doors 19 provide access to the vehicle interior 14. In a sedan-style vehicle as shown in FIG. 1 the doors 19 may be rear doors positioned adjacent the rear seat 17. In an alternative coupe-style or 2-door configuration the vehicle 10 may have only one set of doors 19, i.e., front doors adjacent to the front seats 15D and 15P.

The vehicle 10 further includes a controller (C) 50 and a display screen 28, with the latter shown in one possible embodiment as being an integral part of the center stack 25. In other embodiments the display screen 28 may be a screen within an instrument cluster, a heads up display, or any other suitable high-visibility surface within the vehicle interior 14. The display screen 28 and controller 50 may together make up a system as part of a combined navigation system and entertainment system ("infotainment system"). Therefore, the controller 50 may be embodied as a human-machine interface for control of, for instance, map/route planning and display, a DVD/CD player, a radio, heating, ventilation, and air conditioning (HVAC) controls, and the like. The display screen 28 is operable to display user prompts (arrow 13) from the controller 50 and to transmit input signals (arrow 11) to the controller 50 in response to a touch or other activation or selection of the display screen 28. While a touch screen is a typical HMI interface in modern vehicles, the method 100 may also be performed using conventional buttons, knobs, "hands-free"/voice recognition software, or other suitable input devices or methods.

Figure 2:
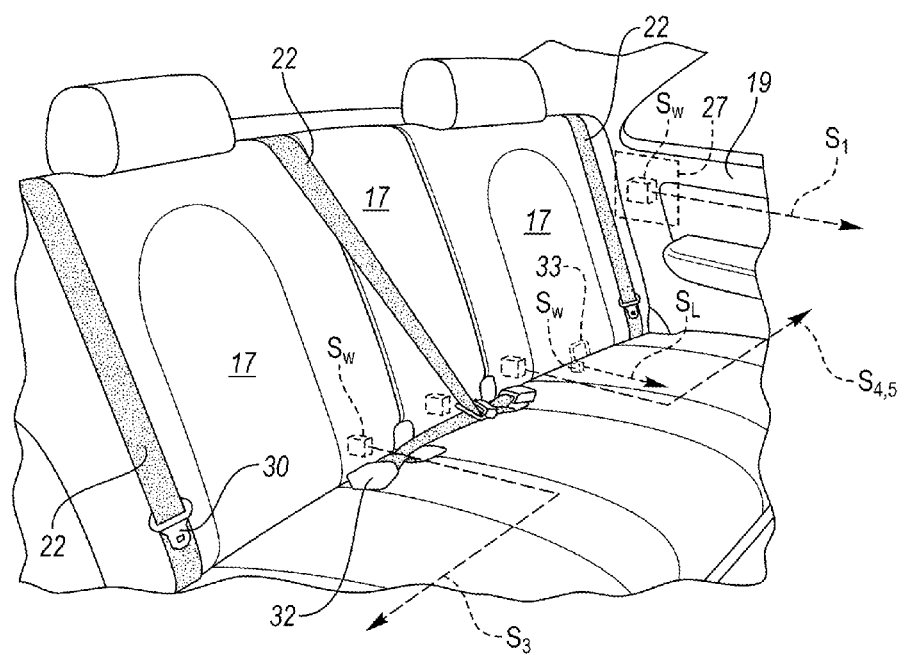
FIG. 2 is a perspective view illustration of an example rear seat usable as part of the vehicle shown in FIG. 1.

Additionally, the rear seat 17 includes a set of seat belts 22, e.g., three separate seat belts 22 in a typical bench-style seat embodiment having, in effect, as many as three possible rear seats 17. The driver seat 15D and passenger seat 15D include similar seat belts 22 which are omitted from FIG. 1 for illustrative clarity. As shown in FIG. 2, the seat belts 22 include a latch plate 30 that is insertable into a mating seat belt buckle 32. Upon insertion of the latch plate 30 into the seat belt buckle 32, the latch plate 30 locks into place to secure a passenger or object to the rear seat 17. Thus, each seat belt buckle 32 has two possible latch states: open/unlatched and closed/latched.

Each seat belt buckle 32 of FIG. 2 and door 19 of FIG. 1 includes a respective buckle latch sensor (Sw). Each buckle latch sensor (Sw) is operable to determine an open/unlatched or closed/latched latch state for the seat belt buckle 32. Likewise, the door(s) 19 each have a corresponding door latch sensor ($S_w$). The buckle and door latch sensors (Sw) are operable for transmitting a switch output signal (arrows $S_1$-$S_5$) to the controller 50 or otherwise communicating the latch state of a respective seat belt buckle 32 or door 19 as part of a method 100. The switch output signals (arrows $S_1$-$S_5$) are then processed by the controller 50 as part of the method 100, which is executed to notify a driver of the vehicle 10 of the possibility of the presence of passengers or objects positioned in the rear seat 17, particularly at the end of an ignition cycle or trip.

Figure 4:
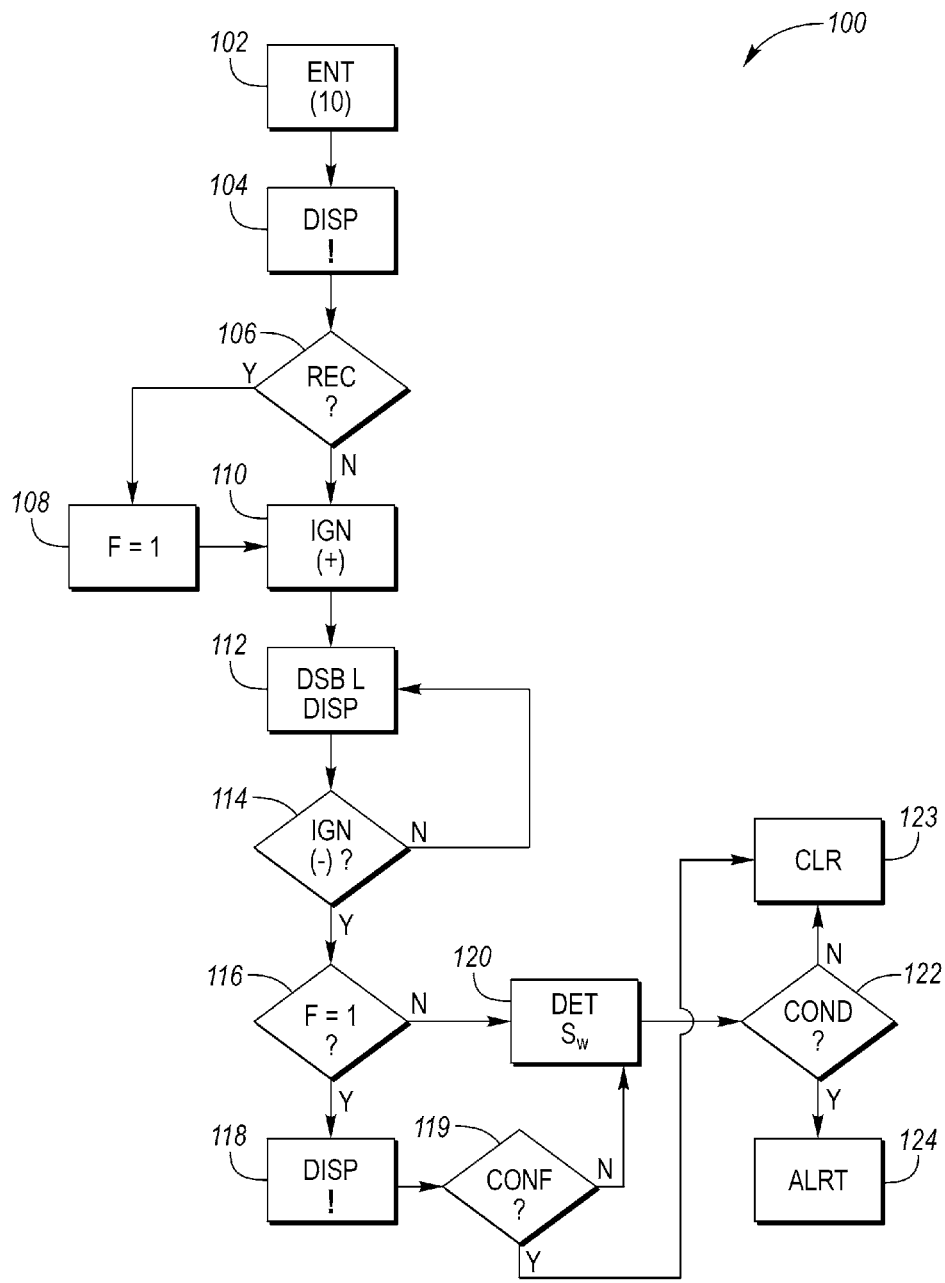
FIG. 4 is a flow chart describing an example method for notifying a driver of the vehicle of FIG. 1 of the possible presence of passengers or objects in the rear seat.

As the rear seat 17 remains out of easy view of the driver, at times the driver may not be fully aware of the presence of passengers or objects in the rear seat, and as a result could exit the vehicle 10 without attending to any passengers or objects remaining in or on the rear seat 17. An example embodiment of the method 100, which is shown in FIG. 4 and described below, is therefore intended to facilitate notification of the driver without requiring additional complex sensors, although such sensors may be used to augment the method 100 of present disclosure.

The controller 50 shown in FIG. 1 may be any suitable computer-based controller that is specially programmed to execute the method 100. For example, the controller 50 may be an HMI controller, a vehicle body module controller, a navigation system controller, or the like, and may include the functionality and structure of a vehicle telematics unit. As is well known in the art, a vehicle telematics unit is the particular hardware/software used to integrate telecommunications, vehicle information, and communications technologies aboard a given vehicle and to send, receive, and store such information. Such functionality may be used as an optional part of the notification process in executing method 100 as set forth below.

The controller 50 also includes a processor (P) and memory (M), the latter including but not limited to optical or magnetic read only memory (ROM), random access memory (RAM), electrically-programmable read-only memory (EPROM), and the like. The controller 50 further includes electrical circuitry including but not limited to a high-speed clock, analog-to-digital (A/D) circuitry, digital-to-analog (D/A) circuitry, a digital signal processor or DSP, and the necessary input/output (I/O) devices and other signal conditioning and/or buffer circuitry.

An optional camera 40 may be positioned within the vehicle interior 14, such as mounted to the headliner (not shown) of the vehicle interior 14, and used to capture an image of the rear seat 17, for instance in response to an ignition-on and/or an ignition-off event. In such an embodiment, the camera 40 may be provided with a field of view (a) that is wide enough to capture the rear seat 17 in its entirety. The controller 50 may receive an image file (arrow 42) from the camera 40 and display the captured image via the display screen 28 as part of the method 100. As another option, a text or voice message (arrow 44), possibly embedded with the image file (arrow 42), may be transmitted to a device 60, e.g., a smart phone or a tablet. In this manner, even if the driver does not notice the various escalating alerts provided while the driver remains within the vehicle interior 14, the driver is still notified upon exiting the vehicle 10.

Referring briefly to FIG. 2, the rear seat 17 is, as noted above, equipped with a plurality of seat belt assemblies each having a seat belt 22 and a mating seat belt buckle 32. In the example FIG. 2 embodiment, three different sets of seat belts 22 and seat belt buckles 32 are included, with each seat belt 22 having a corresponding seat belt buckle 32. One or more LATCH anchors 33 may be positioned with respect to the rear seat 17. Each of the switch output signals (arrows $S_3$-$S_5$) defines a respective latched/unlatched or closed/open latch state of a respective one of the seat belt buckles 32. Likewise, the switch output signals (arrows $S_1$ and $S_2$) define the latch state of a door latch 27 of a respective one of the doors 19, only one of which is shown in FIG. 2. Optionally, the LATCH anchors 33 may be equipped with an additional sensor ($S_w$), such as a tension sensor to measure a force or tension on the LATCH anchors 33, operable for outputting a switch output signal ($S_L$). Such an additional sensor may help determine if a child restraint is currently latched to the LATCH anchor 33. In this manner, the controller 50 of FIG. 1 is aware at all times of the latch state of the doors 19 and whether the seat belts 22, with or without respect to the LATCH anchors 33 depending on the design, are securely fastened to the seat belt buckles 32.

Figures 3A, 3B:
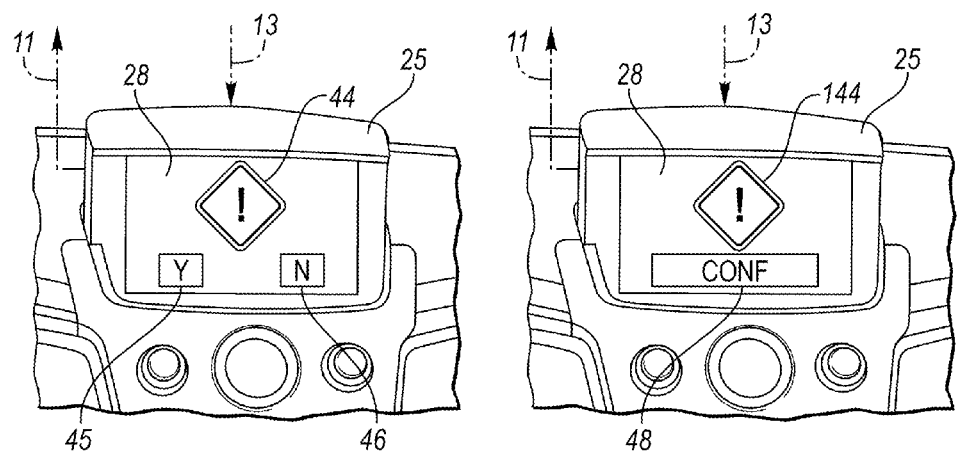
FIG. 3A is a schematic illustration of an example display screen and alert input configuration usable with the vehicle of FIG. 1.
FIG. 3B is another schematic illustration of the display screen of FIG. 3A with a possible alert output configuration.

Referring to FIGS. 3A and 3B, in an optional embodiment a driver of the vehicle 10 of FIG. 1 may be prompted, for instance immediately upon being seated in the vehicle and inserting a key into the ignition, pushing a start button, or otherwise completing an ignition-on event, via transmission of the user prompts (arrow 13) to the display screen 28, whether a passenger or an object is present in the rear seat 17. For instance, an icon 44 and/or message such as "is there a passenger/object in the rear seat?" may be displayed on the display screen 28. The driver can then confirm whether or not a passenger or object is in fact present in the rear seats 17, e.g., by pressing or touching a corresponding confirmation icon 45 or 46, with icons 45 and 46 respectively corresponding to yes (Y) and no (N) in FIGS. 3A and 3B. Such touching of the icons 45 or 46 results in transmission of the input signals (arrow 11) to the controller 50, with the input signals (arrow 11) in this instance providing confirmation, i.e., a selected response, prior to commencing the trip.

After the trip is finished, which may be determined by the controller 50 based on the ignition state, the controller 50 can immediately alert the driver as to the presence of the passenger or object in the rear seat 17 via another icon 144, e.g., "passenger/object in rear seat" or "check rear seat". Another icon 48 may be displayed for confirmation (CONF) of the driver's receipt of the alert notification. In different embodiments, failure of the driver to touch the icon 48 or otherwise signal confirmation of the alert within a calibrated duration of ignition-off may result in additional escalating control actions being taken by the controller 50.

Example control actions may range from sounding an audible alarm such as a tone or voice message within the vehicle interior 14, e.g., via speakers positioned in the vehicle interior 14, flashing or otherwise animating the icon 44, flashing interior lights of the vehicle 10, sounding a horn of the vehicle 10, etc. Optionally, the prior-noted vehicle telematics unit of the controller 50 may be used to transmit the text or voice message (arrow 44 of FIG. 1) to the device 60 shown in FIG. 1 notifying the driver as to the possible presence of a passenger/object in the rear seat 17. It is envisioned that all such notifications options may be selectively disabled by a given driver via the touch screen 28 and controller 50 so as to customize the notification experience.

Referring to FIG. 4, an example embodiment of the method 100 begins with step 102, wherein the driver of the vehicle 10 of FIG. 1 enters the vehicle 10 and starts the ignition, i.e., an ignition-on event. Step 102 may entail communication of the switch output signals (arrows $S_1$-$S_5$) of FIG. 1 to the controller 50 in response to the ignition-on event. The switch output signals ($S_1$-$S_5$) may be time-stamped so that the controller 50 can determine an amount of elapsed time since the latch state of the seat belt buckle 32 and/or the door 19 changed to the closed latch state. Such temporal information can later be used to inform a progressively escalating set of alerts as explained below.

At step 104, the controller 50 may display an icon or message, which is represented in a non-limiting generic example in FIG. 4 as an exclamation point or "!" symbol. Step 104 may entail displaying the icon 44 of FIG. 3A on the display screen 28 as explained above. If the controller 50 is not programmed to prompt the driver as in FIG. 3A, whether or not a passenger/object is present in the rear seat 17, step 104 may still entail displaying a default icon 44 or message such as "look in rear seat" or "check rear seat for occupants or objects". The method 100 proceeds to step 106 upon displaying the icon 44.

At step 106, the controller 50 determines if a confirmation signal is received which corresponds to a touching of icon 45 as shown in FIG. 3A. If such an action has not occurred, or if the controller 50 is not programmed to prompt the user for such information at prior step 104, then the method 100 proceeds to step 110. However, the method 100 proceeds to step 108 if icon 45 of FIG. 3A was touched or otherwise selected.

Step 108 may include setting a flag in logic of the controller 50 indicating the answer provided by the driver at step 104. For instance, a representative flag F may be set to 1, i.e., F=1 as shown in FIG. 4, via a suitable control or data command to indicate that the controller 50 should provide a corresponding reminder at step 116. The method 100 then proceeds to step 110.

Step 110 includes verifying that the ignition state is on, i.e., IGN (+), and the vehicle is presently in gear, and then at step 112 temporarily disabling (DSBL) display of any rear-seat passenger/object-related information on the touch screen 28. The method 100 proceeds to step 114.

At step 114, the controller 50 of FIG. 1 next determines if the ignition state has changed to off, i.e., IGN (−). The method 100 proceeds to step 116 if the driver has turned off the ignition or has otherwise commanded an ignition-off event. Otherwise, steps 112 and 114 are repeated in a loop.

Step 116 includes determining the value of the flag set at prior step 108. The method 100 proceeds to step 118 if the value of the flag indicates that the driver previously confirmed that a passenger/object is in the rear seat 17. The method 100 otherwise proceeds to step 120.

At step 118, in response to a determination at step 116 that a passenger/object is present in the rear seat, the method 100 includes displaying another icon 144 or message as in FIG. 3B. Step 118 may optionally include briefly displaying an image or images of the rear seats 17, captured via the camera 40 of FIG. 1 in response to an ignition-on or ignition-off event of the same trip, and then proceeding to step 119.

Step 119 includes determining via the controller 50 whether the driver has confirmed receipt of the information in the displayed icon 144 from step 118, such as by touching the additional icon 48 shown in FIG. 3B. The method 100 proceeds to step 120 if no confirmation is received, and to step 123 if such confirmation is received.

At step 120, the controller 50 again determines the various latch states of the doors 19 and seat belt buckles 32 shown in FIG. 2, which is information that was previously communicated to the controller 50 at step 102. The method 100 then proceeds to step 122.

Step 122 includes determining, via the controller 50, if conditions exist that are indicative of a possible passenger/object being present in the rear seat 17. Criteria may include whether any of the seat belt buckles 32 shown in FIG. 2 are presently in a latched state, or were otherwise latched or closed within a calibrated amount of time of the last ignition-on cycle. Criteria may also include whether the rear doors 19 have closed within the same or a different calibrated amount of time prior to starting the vehicle 10, such as within 5-10 minutes of an ignition-on event. Closing of the doors 19 shortly before starting a trip, for instance, may be evidence of a passenger accessing the vehicle interior 14 adjacent to the rear seats 19 or a driver placing an object on the rear seat 19.

Likewise, a latched seat belt 22 may be an indication of a secured passenger or object. It is recognized herein that child restraints in particular tend to remain latched in place for long periods of time. Even with such child restraints, however, temporal information describing precisely when the seat belts 22 were latched may be useful in determining whether the present latched state has a higher or lower likelihood of indicating the presence of a passenger/object. For example, the mere presence of a child restraint in the rear seat 17 may indicate, for a given vehicle 10, that the presence of a passenger is possible or even likely, as otherwise the driver would not be likely to continue driving with the child restraint in place in the rear seat 17.

If the controller 50 determines that present conditions indicate that no passenger/object is likely to be present, the method 100 proceeds to step 123. However, if the presence of a passenger/object is determined to be likely based on the collective switch out signals (arrows $S_1$-$S_5$), then the method 100 proceeds in the alternative to step 124.

Step 123 may entail displaying a simple "check rear seat" or similar message or icon for a brief time, e.g., a few seconds, as a first control action before clearing all icons/messages from the display screen 28. While not required due to the driver confirming the presence of the passenger/occupant at step 119, step 123 could also include a brief display of an image of the rear seat 17 from the optional camera 40 of FIG. 1 if the vehicle 10 is so equipped. The method 100 then begins anew with step 102 upon the next ingress of a driver into the vehicle 10.

Step 124 includes transmitting an alert (ALRT) to the vehicle interior 14 of FIG. 1 commensurate with the collective information in the switch signals (arrows S1-S5). For example, if the doors 19 were closed within a calibrated duration of the ignition-on event, or if the doors 19 were not closed in such a duration but one or more of the seat belts 22 in the rear seats 17 are latched, this may result in display of a suitable "check rear seats for occupants or objects" message on the display screen 28 of FIGS. 3A and 3B and one additional control action, for instance an extra indicator such as a flashing of the message, an audio tone, or a flashing of interior lights of the vehicle 10. If the doors 19 were closed in such a duration and one or more of the seat belts 22 in the rear seats 17 are latched, this may result in display of the "check rear seats" message and multiple additional indicators, such as the flashing of the message, the audio tone, a flashing of interior lights of the vehicle 10, sounding of a horn of the vehicle 10, transmission of a voice or text message to the operator, etc.

In the embodiments described above, the controller 50 and method 100 provide a configurable, escalating set of alerts or warnings when the various latch states described herein are indicative of a higher relative likelihood that a passenger or object is present in the rear seat 17 at the end of a trip or ignition cycle. In some embodiments, the driver of the vehicle 10 of FIG. 1 may be asked to confirm whether a passenger/object is in the rear seat 17 at the start of a trip, as in the example of FIG. 3A, and asked once again to confirm receipt of the notification as in FIG. 3B at the end of the same trip.

If a given driver does not care to view such alerts during each trip, the controller 50 may be programmed such that the driver may selectively disable execution of the method 100 via the touch screen 28. If the driver does not confirm that a passenger/occupant is present at the start of a trip, or if the controller 50 is not programmed to initially inquire as to this presence, the controller 50 can still evaluate the likelihood of such a presence and escalate the notifications or alerts depending on the states of the latches of the doors 19 and seat belt buckles 32 of FIGS. 1 and 2. As a result, no additional hardware is required to implement the present method 100 absent the optional camera 40 shown in FIG. 1.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a body defining a vehicle interior and having a door that provides access to the vehicle interior, wherein the door includes a door latch;
a display screen;
a front seat oriented facing the display screen;
a rear seat positioned aft of the front seat;
a seat belt and a seat belt buckle together configured to secure a passenger or object to the rear seat;
a buckle latch sensor operable to determine an open/unlatched or closed/latched latch state of the seat belt buckle;
a door latch sensor operable to determine an open/unlatched or closed/latched latch state of the door latch; and
a controller in communication with the buckle latch sensor, the door latch sensor, and the display screen, wherein the controller is programmed to:
determine the respective latch states of the seat belt buckle and the door latch via the respective buckle latch sensor and door latch sensor;
determine an ignition-on event and an ignition-off event of an ignition cycle of the vehicle;
determine an amount of elapsed time between the ignition-on event and the latch state of the seat belt buckle or the latch state of the door latch, or both, being changed to the closed/latched latch state;
display a first icon or message via the display screen as a first control action in response to the ignition-off event of the vehicle, wherein the icon or message prompts a driver of the vehicle to check the rear seat for the presence of the passenger or object; and
execute a second control action, in addition to the first control action, in response to the ignition-off event and a determination that the elapsed time is less than a calibrated amount of time, wherein the second control action prompts the driver of the vehicle to check the rear seat in a manner distinct from the first control action.

2. The vehicle of claim 1, wherein the controller is further programmed to:
display, via the display screen upon detection of the ignition-on event of the vehicle, a second icon or message prompting a driver of the vehicle to confirm whether the passenger or object is present in the rear seat; and
receive a confirmation signal via the display screen in response to display of the first icon or message.

3. The vehicle of claim 1, wherein the second control action is selected from the group consisting of: sounding an audible alarm within the vehicle interior, flashing the first icon, flashing an interior light of the vehicle, and sounding a horn of the vehicle.

4. The vehicle of claim 1, wherein the second control action includes transmitting a text or voice message to a device positioned external to the vehicle.

5. The vehicle of claim 1, further comprising a camera operable to capture an image of the rear seat in response to one of the ignition-on event and the ignition-off event, wherein at least one of the first and second control actions includes displaying the captured image via the display screen upon occurrence of the ignition-off event.

6. The vehicle of claim 1, wherein the controller is further programmed to:
display, via the display screen in response to the ignition-off event of the vehicle, a second icon or message prompting the driver of the vehicle to confirm whether the passenger or object is present in the rear seat; and execute the second control action in response to the controller not receiving a confirmation signal within a calibrated duration of time after displaying the second icon or message.

7. The vehicle of claim 1, wherein the controller is further programmed to:

display, via the display screen in response to the ignition-on event of the vehicle, a second icon or message prompting the driver of the vehicle to confirm the passenger or object is present in the rear seat; and execute the first control action in response to the ignition-off event and the controller receiving a confirmation signal that the passenger or object is present in the rear seat.

8. The vehicle of claim 1, wherein the controller is further programmed to:

display, via the display screen in response to the ignition-on event of the vehicle, a second icon or message prompting the driver of the vehicle to confirm the passenger or object is not present in the rear seat; and disable the first and second control actions in response to the controller receiving a confirmation signal that the passenger or object is not present in the rear seat.

9. The vehicle of claim 1, further comprising an instrument cluster or a center stack mounted inside the vehicle interior forward of the front seat, wherein the display screen is part of the instrument cluster or center stack.

10. The vehicle of claim 1, wherein the rear seat is one of a bucket-style seat and a bench-style seat.

11. A method for notifying a driver of a vehicle of a passenger or object in a rear seat of the vehicle, the vehicle having a seat belt with a seat belt buckle, a vehicle door with a door latch, and a display device with a display screen, the method comprising:

determining respective open/unlatched or closed/latched latch states of the seat belt buckle of the rear seat and of the door latch of the vehicle door via respective seat belt buckle and door latch sensors;

determining an ignition-on event and an ignition-off event of an ignition cycle of the vehicle;

determining an amount of elapsed time between the ignition-on event and the latch state of the seat belt buckle or the latch state of the door latch, or both, being changed to the closed/latched state;

displaying a first icon or message via the display screen of the vehicle as a first control action in response to the ignition-off event of the vehicle, the first icon or message prompting the driver of the vehicle to check the rear seat of the vehicle for the presence of the passenger or object; and executing, via a controller, a second control action, in addition to the first control action, in response to the ignition-off event and a determination that the elapsed time is less than a calibrated amount of time, the second control action prompting the driver of the vehicle to check the rear seat in a manner distinct from the first control action.

12. The method of claim 11, further comprising:

displaying via the display screen, upon detection of the ignition-on event of the vehicle, a second icon or message prompting the driver of the vehicle to confirm whether the passenger or object is present in the rear seat; and receiving, via the controller, a confirmation signal from the display screen in response to display of the first icon or message.

13. The method of claim 11, wherein executing the second control action includes at least one of: sounding an audible alarm within the vehicle interior, flashing the first icon, flashing an interior light of the vehicle, and sounding a horn of the vehicle.

14. The method of claim 11, wherein executing the second control action includes transmitting a text or voice message to a device positioned external to the vehicle.

15. The method of claim 11, wherein the vehicle includes a camera operable to capture an image of the rear seat in response to one of the ignition-on event and the ignition-off event, wherein at least one of the first and second control actions includes displaying the captured image via the display screen upon occurrence of the ignition-off event.

16. A system for use in a vehicle having a door, a front seat, and a rear seat aft of the front seat that includes a seat belt assembly, the system comprising:

a display screen; and a controller in communication with the display screen, a buckle latch sensor operable to detect a closed/latched or open/unlatched latch state of a seat belt buckle of the seat belt assembly, and a door latch sensor operable to detect a closed/latched or open/unlatched latch state of a door latch of the door, wherein the controller is programmed to:

receive corresponding latch signals from the seat belt buckle sensor and the door latch sensor to thereby determine the respective latch states of the seat belt buckle and the door latch;

determine an ignition-on event and an ignition-off event of an ignition cycle of the vehicle;

determine an amount of elapsed time between the ignition-on event and the latch state of the seat belt buckle or the latch state of the door latch, or both, being changed to the closed/latched latch state;

display a first icon or message via the display screen as a first control action in response to the ignition-off event of the vehicle, wherein the icon or message prompts a driver of the vehicle to check the rear seat for the presence of a passenger or object; and execute a second control action, in addition to the first control action, in response to the ignition-off event and a determination that the elapsed time is less than a calibrated amount of time, wherein the second control action prompts the driver of the vehicle to check the rear seat in a manner distinct from the first control action.

17. The system of claim 16, wherein the controller is programmed to display, via the display screen upon detection of the ignition-on event of the vehicle, a second icon or message prompting a driver of the vehicle to confirm whether the passenger or object is present in the rear seat, and to receive a confirmation signal via the display screen in response to display of the first icon or message.

18. The system of claim 16, wherein the second control action is selected from the group consisting of: sounding an audible alarm within the vehicle interior, flashing the first icon, flashing an interior light of the vehicle, and sounding a horn of the vehicle.

19. The system of claim 16, wherein the second control action includes transmitting a text or voice message to a device positioned external to the vehicle.

20. The system of claim 16, further comprising a camera operable to capture an image of the rear seat in response to one of the ignition-on event and the ignition-off event, wherein at least one of the first and second control actions includes displaying the captured image via the display screen upon occurrence of the ignition-off event.

\* \* \* \* \*